United States Patent [19]

Cook et al.

[11] Patent Number: 5,504,928
[45] Date of Patent: Apr. 2, 1996

[54] METHOD AND APPARATUS FOR PROVIDING MULTI-COMMAND SUPPORT IN A RENDERING ADAPTER

[75] Inventors: John A. Cook; Linas L. Vepstas, both of Austin, Tex.

[73] Assignee: International Business Machines Corporation, Armouk, N.Y.

[21] Appl. No.: 416,586

[22] Filed: Apr. 3, 1995

Related U.S. Application Data

[63] Continuation of Ser. No. 229,075, Apr. 18, 1994, abandoned, which is a continuation of Ser. No. 734,397, Jul. 23, 1991, abandoned.

[51] Int. Cl.[6] ................................................. G06F 15/16
[52] U.S. Cl. .................... 395/882; 395/500; 395/800; 395/828; 395/883; 395/884; 364/DIG. 2; 364/239; 364/239.3; 364/239.1
[58] Field of Search ................................. 395/800, 500, 395/882, 883, 884, 828

[56] References Cited

U.S. PATENT DOCUMENTS

| 4,651,278 | 3/1987 | Herzog et al. | 395/117 |
|---|---|---|---|
| 4,855,905 | 8/1989 | Estrada et al. | 395/500 |
| 4,875,186 | 10/1989 | Blume, Jr. | 395/500 |
| 4,888,680 | 12/1989 | Sander et al. | 395/500 |
| 5,179,690 | 1/1993 | Ishikawa | 395/500 |
| 5,261,114 | 11/1993 | Raasch et al. | 395/800 |
| 5,301,304 | 4/1994 | Meuon | 395/500 |

FOREIGN PATENT DOCUMENTS

| 0169565 | 1/1986 | European Pat. Off. . |
|---|---|---|
| 0292355 | 11/1988 | France . |
| 8401635 | 4/1984 | WIPO . |

OTHER PUBLICATIONS

IBM marketing letter 191–049, dated Mar. 19, 1991.
J. L. Baer, "Computer Systems Architecture", Computer Science Press, 1980, pp. 355–357.

Primary Examiner—Alyssa H. Bowler
Assistant Examiner—L. Donoghue
Attorney, Agent, or Firm—Paul S. Drake; Wayne P. Baily

[57] ABSTRACT

A method and apparatus for supporting multiple command sets in a single rendering adapter. A device driver operating in tandem with a rendering adapter and its associated microcode interprets disparate command sets without separate control/interpretation sections being maintained in the rendering adapter. Rendering adapter microcode in the adapter for supporting a first command set is extending to support commands in a second command set not capable of being mapped in the first command set. The device driver receives the disparate data stream command sets generated by application programs and destined for the rendering adapter. If a first command set command is received by the device driver, it is passed on to the rendering adapter substantially unmodified. If a second command set command is received by the device driver, an attempt is made to map the command into a first command set command, and then transfer this mapped command to the rendering adapter. If no mapping is possible, the received command is reformatted to conform to the syntax of the first command set, and then sent to the rendering adapter. As the rendering adapter microcode has been extending beyond interpreting and executing the first command set, this reformatted second command set command can be processed by the same parser resident in the rendering adapter microcode.

25 Claims, 5 Drawing Sheets ns, new command sets were created to support these 3-d graphics adapters. In addition, differing 3-d command sets have evolved which conform to various industry de-facto and international standards. In the prior art, these graphics adapters have generally been designed to handle a single type of command set. This single-command set support was required to maximize the performance of the graphics adapter's ability to accept drawing commands and render a drawing on the processing system display or printer. This single-command set support was also desired in order to minimize system costs, as the number and complexity of rendering adapter components increases substantially if more than a single command set were to be supported. This is due to increases in control circuitry and/or rendering adapter microcode required to detect and interpret multiple command set data streams. In general, a given user environment does not want the increased overhead and associated performance degradation when the processing system actually being used is generating a single command set. Providing a multi-command set function causes an end-user to unnecessarily shoulder an increase in system overhead and cost.

METHOD AND APPARATUS FOR PROVIDING MULTI-COMMAND SUPPORT IN A RENDERING ADAPTER

This is a continuation of application Ser. No. 08/229,075 filed Apr. 18, 1994, now abandoned which is a continuation of Ser. No. 07/734,397 filed Jul. 23, 1991, now abandoned.

RELATED APPLICATIONS

This patent application is related to copending U.S. patent application Ser. No. 67/734,428, filed Jul. 23, 1991 and entitled "Display Adapter Supporting Priority Based Functions", hereby incorporated by reference now abandoned; and U.S. patent application Ser. No. 07/734,427, filed Jul. 23, 1991 entitled "Display Adapter Interface Layer", hereby incorporated by reference now abandoned.

TECHNICAL FIELD

This invention pertains to the field of data processing systems, and more specifically to the construction and interpretation of command data streams used to control rendering components in a data processing system.

BACKGROUND ART

Various data processing rendering components are known in the prior art. Such components translate a series of instructions/commands into specific rendering operations. A graphics adapter acts as an interface between a computer and a computer display device. The graphics adapter accepts drawing commands from a data processing computer or microprocessor, translates these commands, and generates the appropriate driving signals used to drive and display an image on a computer display. A printer adapter similarly accepts printing commands, interprets these commands, and generates the driving signals used to actuate the printer's electrical, electromagnetic, and/or laser-controlled print engine.

These types of adapters are designed to accept a known and defined syntax or command set. Examples of such graphics command sets are PHIGS, GL, and GKS. These command sets contain the actual drawing commands used to generate graphical displays on a data processing systems' display device. Examples of data streams sent to a rendering printer adapter are Postscript[1] and IPDS. The rendering commands sent to a rendering adapter are generated from some type of command generator. This command generator could be, for example, an drawing/rendering application program running on a data processing computer. Such an application program could be running either locally within the same processing system which contains the graphics adapter, or remotely where the application program is running on a processing system separate from the system containing the graphics adapter and display. In the remote configuration, drawing commands would be transmitted from the application processing system to the drawing system via conventional telecommunications techniques. Various command sets have evolved over the years which correspond to changes in graphics adapter technology. For example, early command sets supported 2-dimensional graphics adapters, which were only capable of displaying 2-dimensional objects. Technological improvements in electronic packaging density have resulted in 3-dimensional graphics adapters being introduced into the marketplace. As existing 2-d command sets could not take advantage of the new functionality contained within these 3-d graphics adapt-

[1] Trademark of Adobe Systems, Inc.

However, some end-users do have a need for supporting multiple command sets, and are willing to pay the costs and absorb the performance degradations associated with such multi-command set support. To meet this demand of supplying multiple command set functionality, prior art systems have provided two distinct command set interpreters in the rendering adapter, one for each respective command set. This has resulted in a substantial increase in cost over and above a single command set rendering adapter. This increase in cost results from increases in volatile and/or nonvolatile data processing memory and other control electronics used to switch between command sets efficiently in order to minimize the resultant system performance degradation. Today's prior art does not address or provide for a system which can support multiple command sets for a rendering adapter in a cost/performance efficient manner.

DISCLOSURE OF THE INVENTION

This invention solves the aforementioned problems by providing a method and apparatus for supporting multiple command sets in a single rendering adapter. The disclosed method and apparatus does not require separate adapter control/interpretation sections on the adapter for each respective command set. Rather, the disclosed method and apparatus provides a framework which can interpret either and/or both command sets with a single control/interpretation section contained within the rendering adapter. This results in a decrease in adapter complexity, associated adapter memory requirements, and overall adapter costs. Multiple-command set system performance comparable to that of single-command set systems is also maintained.

These results are achieved by a device driver operating in tandem with a rendering adapter and its associated microcode. A first command set is defined which represents the largest command set being supported in the system. A second command set is defined which represents a second command set being supported. Rendering adapter microcode in the adapter for supporting the first command set is extended to support commands in the second command set not common to, or capable of being mapped into, the first command set.

The device driver receives disparate data stream command sets generated by application programs and destined for the rendering adapter. If a first command set is received by the device driver, it is passed on, or transmitted, to the rendering adapter substantially unmodified. If a second command set command is received by the device driver, an attempt is made to map the command into a first command set command, and then pass this mapped command to the rendering adapter as a resulting first command set command. If no mapping is possible, i.e. no equivalent command exists in the first command set or the command is not common to both command sets, then the received command is reformatted to conform to the syntax of the first command set, and contains the received second command set unique command internal to this reformatted package. This reformatted second command set unique command is then sent to the rendering adapter as a resulting first command set command. As the rendering adapter microcode has been extended beyond interpreting and executing the first command set, this reformatted second command set unique command can be processed by the same parser resident in the rendering adapter microcode. In this fashion, the microcode residing on the rendering adapter only needs to parse and route a single data stream syntax.

As to the rendering adapter microcode, a first state is defined for the first command set to be supported in the multi-command set adapter. The state refers to such things as color, normal, positions, stacks of pick-identifying names, pick data, and stacks of matrices. A second state is defined for the second command set to be supported. A special command is added to the adapter command set to allow switching between these first and second states. For rendering commands which are common to either command set, this command is used to direct the commands to use the proper state variables.

Resource control commands contained within the two command sets were similarly modified to present a single, uniform data stream to the rendering adapter. As a result, only a small subset of new resource control command functionality was added to the adapter microcode to support the additional functionality contained in the second command set.

The resulting system reduces the overall system complexity, the amount of adapter microcode required, and system cost while maintaining performance equivalent to a single command set system. The methods and apparatus hereinafter described can be used for a wide variety of rendering adapters including, but not limited to, graphics, printer, multimedia, and audio.

It is thus an object of the present invention to provide an improved method and apparatus for rendering components.

It is a further object of the present invention to provide a rendering component which supports multiple command sets.

It is yet another object of the present invention to provide an improved data processing system.

It is yet another object of the present invention to provide an improved graphics system.

It is still another object of the present invention to provide an improved graphics adapter.

It is yet another object of the present invention to provide an improved printer system.

It is still another object of the present invention to provide an improved printer adapter.

It is yet another object of the present invention to provide an improved multimedia system.

It is still another object of the present invention to provide an improved multimedia adapter.

BRIEF DESCRIPTION OF THE DRAWING

The foregoing and other objects, aspects and advantages of the invention will be better understood from the following Best Mode for Carrying Out the Invention with reference to the figures listed below, in which.

BEST MODE FOR CARRYING OUT THE INVENTION

Figure 1:
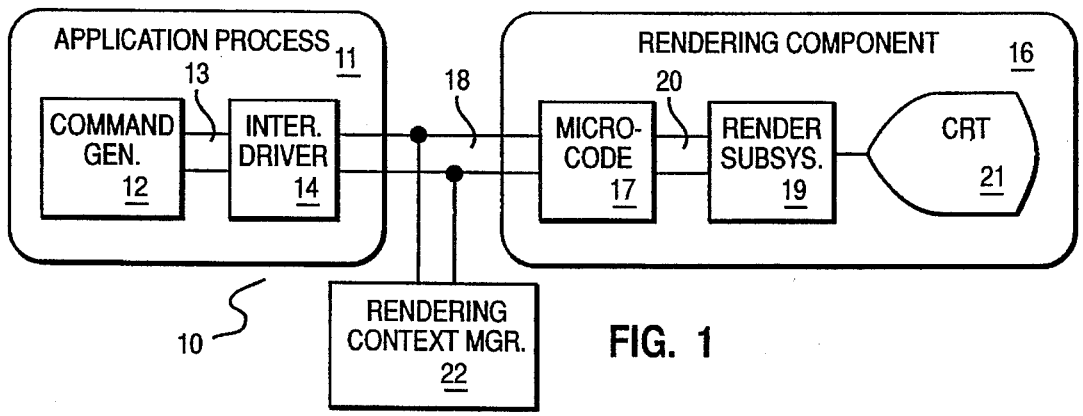
FIG. 1 shows the interplay between a command generator, rendering component, and rendering device.

FIG. 1 shows a data processing system 10 and the interplay between an application process 11 comprising a command generator 12 and an intermediate driver 14, and a rendering component 16. The command generator 12 could be an application program executing on a computer. An intermediate driver 14 receives rendering commands destined for the rendering device 16. In the preferred embodiment, this intermediate driver 14 is a subroutine library which services the appropriate rendering component 16. As will be further discussed, the intermediate driver 14 manipulates and combines disparate incoming command sets and produces a single command set data stream. This resultant single command set data stream is then transferred to the rendering component 16. In the preferred embodiment, this rendering component is a graphics adapter. However, as will be understood by those skilled in the art, the concepts herein disclosed would similarly apply to other types of rendering devices, such as printer adapters, multimedia adapters, and audio adapters.

The interface 13 between the command generator 12 and the intermediate driver 14 is a subroutine calling interface, or API, in the preferred embodiment. An alternate embodiment would have a client/server interface, having a communication interface 13 between a client 12 and a server 14. In this alternate embodiment, the application program 12 transmits messages or commands to a daemon, or receiving process 14 via some mechanism, such as pipes, sockets, streams, shared memory, or semaphores, as is generally known to those of ordinary skill in the art. The output of the intermediate device 14 is a series of commands which are transferred along a channel, bus, or communication link to a rendering adapter 16 via conventional transfer methods 18. Such methods include I/O port addressing, memory mapped I/O, and the like. These commands can contain various kinds of information, such as resource control commands, rendering instructions, or data.

The rendering device 16 is comprised of various subassemblies in the preferred embodiment. Adapter microcode executing on a general purpose digital signal processor (DSP) and hardware/firmware embodied in special purpose gate arrays (bus interface chips) provide the interface function at 17. The DSP connects to a rendering subsystem 19 using conventional internal wiring 20. The rendering subsystem 19, which provides rasterization in the preferred embodiment, is comprised of specialty VLSI chips, banks of VRAM/DRAM memory components, and digital-to-analogy (DAC) chips. The rendering subsystem 19 drives a CRT display 21 in the preferred embodiment. However, there could similarly be a print head at 21 in an alternate embodiment, with the rendering subsystem 19 further comprising control for paper manipulation using conventional electomechanical components and techniques.

A rendering context manager 22 is similarly situated on the transfer means 18. The rendering context manager is a separate process which allows for multiple applications to use a single rendering adapter, by providing conventional multiprocessing support. The specific details of this rendering context manager are not important or relevant to the invention being disclosed herein.

Figure 2:
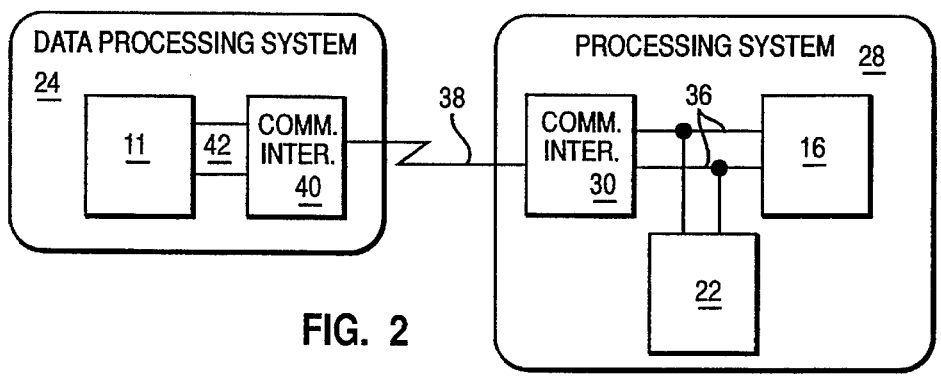
FIG. 2 shows a remote command generator.

FIG. 2 shows another embodiment of the invention wherein a command generator/driver subsystem 11 is located in a data processing system 24 distinct from the processing system 28 containing the rendering component 16. Conventional communications methods 38 are used to connect, or establish a session, between communication interfaces 30 and 40. These communication interfaces connect to the rendering device 34 at 36, and the command generator 11 at 42. It should be understood that the communication interfaces at 30 and 40 may be simple communication adapters, or may be more sophisticated subsystems having computer controlled queuing, scheduling, etc. as is commonly known in the art of remote data processing and internetworking.

Figure 3:
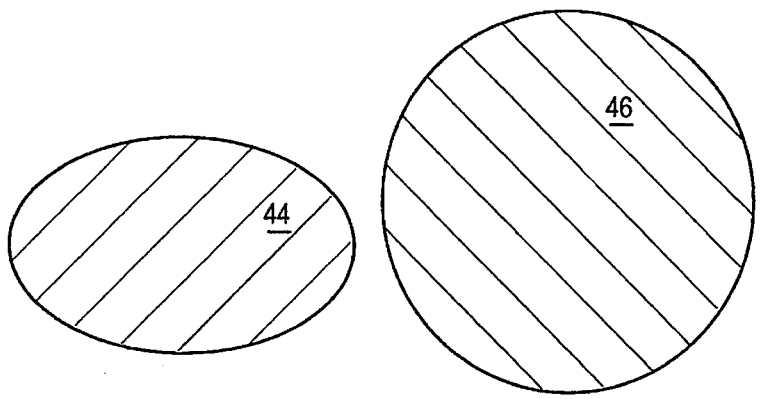
FIG. 3 shows prior art command sets.
Figure 4:
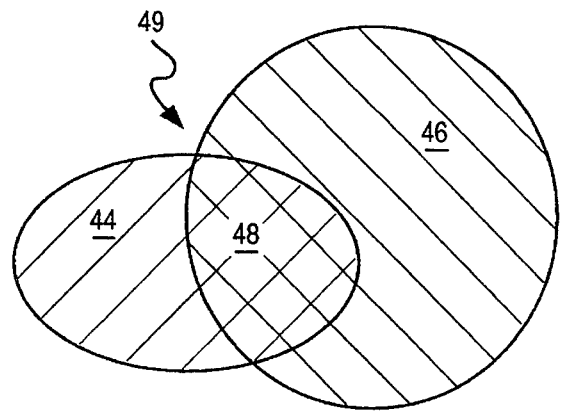
FIG. 4 shows a unified command set built from disparate command sets.

FIG. 3 indicates how prior art systems processed differing command sets. Each distinct command set 44 and 46 are processed by separate and distinct processes on a rendering adapter. The invention described herein has merged these disparate command sets 44 and 46 into a single command set having various components contained within. As shown in FIG. 4, a single command set 49 results from merging the differing command sets 44 and 46 of FIG. 3. First command set commands 46 and second command set commands 44 are merged, with commands common to both command sets being shown at 48. These common commands exist in both the first command set 46 and the second command set 44.

Figure 5A:
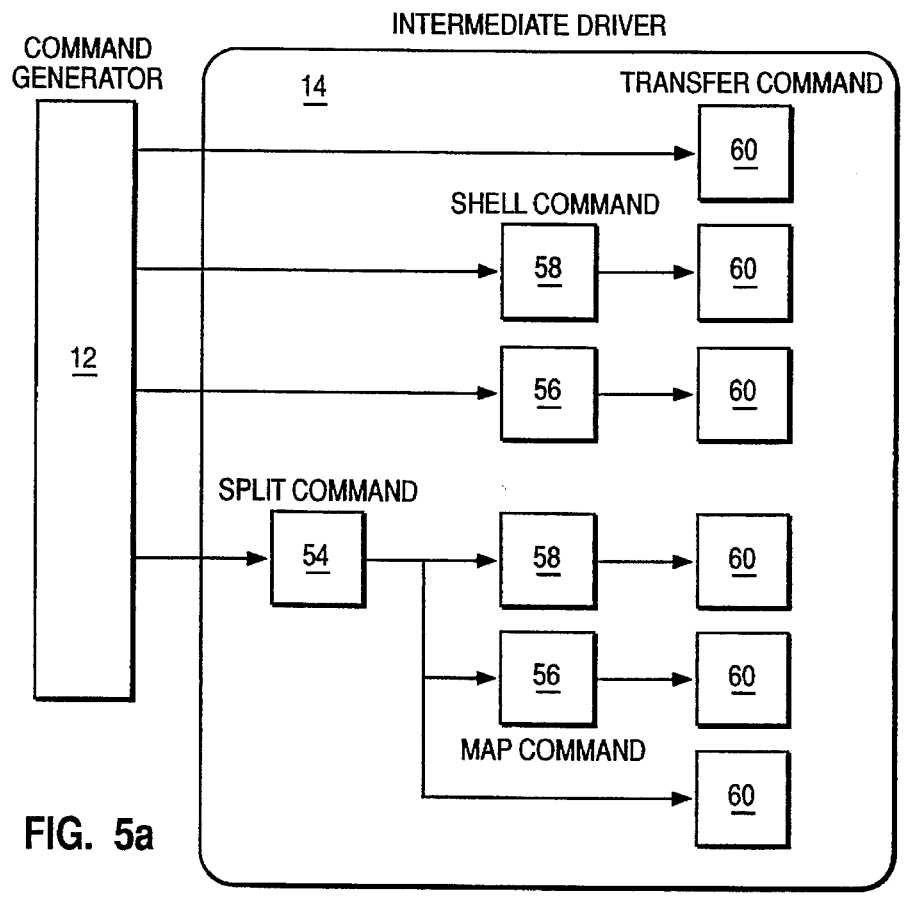
FIGS. 5a–5b detail the internal operation of the intermediate driver.

FIG. 5a details the operation of the combined process 11 of FIG. 1. This combined process consists of an application program or command generator 12, an intermediate driver 14 and their interconnection via a subroutine calling interface 13 (see FIG. 1). When certain commands generated by 12 are known to be a part of the first command set 46 of FIG. 4, such commands cause control to be passed to 60 of FIG. 5a, where the command is transferred on to the rendering component 16 of FIG. 1 without modification. It will be understood that any slight modifications to the command would also be possible and not deviate from the scope and spirit of this invention. For example, a bit could be turned on in a defined field indicating the command had been queried and left unmodified by the device driver. The primary distinction here is that the general content of the received command does not need to be substantially modified prior to passing the command to the rendering component 16 of FIG. 1.

Likewise, certain commands generated by 12 are known to be a part of the second command set 44 of FIG. 4. Such commands cause control to be passed to 58 (the internal function to be later described in more detail), where the received command is embedded within a shell structure having syntax which conforms to a first command set. Control then passes to 60, where the resulting first-command-set-syntax-conforming command is transferred to the rendering component 16 of FIG. 1.

Likewise, certain commands generated by 12 are known to be mappable into an equivalent first command set command 48 of FIG. 4. If so, control passes to 56 where the command is mapped to a resulting first command set command. The mapping is accomplished using standard programming techniques by building the equivalent first command set command and placing parameters in the locations defined for the first command set command. The resulting first command set command is then transferred to the rendering component at 60.

Likewise, certain commands generated by 12 are known to be convertible to combinations of a first and a second command set. If so, control passes to 54 where a significant amount of processing is done to convert the incoming command into one or more of the commands 44, 46, and/or 48 (the internal operation to be later described herein). After such processing and conversion is complete, control is passed directly to 60, or to 56 or 58, where relatively minor mapping and encapsulation is performed before passing control to 60.

Resource control commands contained within the two command sets are similarly modified as described above to present a single, uniform data stream to the rendering adapter. As a result, only a small subset of new resource control command functionality is needed in the adapter microcode to support the additional functionality contained in the second command set.

Figure 5B:
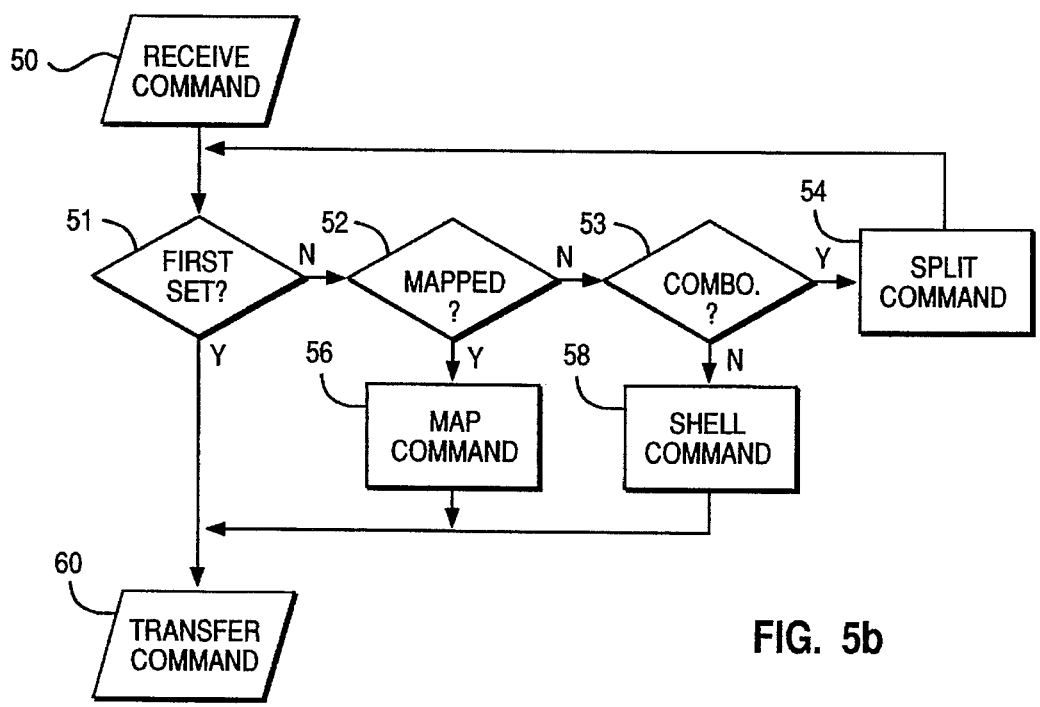

The conceptual model for performing the above is shown in FIG. 5b. Commands are received from the command generator at 50. A determination is made at 51 as to whether this received command is a part of the first command set (46 of FIG. 4) or a common command (48 of FIG. 4). If so, processing continues at 60 where the command is transferred to the rendering component without modification. If the query at 51 indicates the received command is a part of the second command set (44 of FIG. 4), processing continues to 52, where a determination is made on whether the received command can be mapped into an equivalent first command set command 48 of FIG. 4. If so, control passes to 56 where the command is mapped to a resulting first command set command. This resulting first command set command is then transferred to the rendering component at 60. If the query at 52 indicates the received command cannot be mapped into an equivalent first command set command, it is determined at 53 if the received command can be converted to combinations of a first and a second command set commands. If so, this conversion is accomplished at 54, after which the resulting combination of commands are processed by 56, 58 or 60 at described above. If the determination at 53 indicates this is a unique second command set command 44 of FIG. 4, processing at 58 embeds the received command within a shell structure having syntax which conforms to a first command set command. Processing at 60 then passes this resulting first command set command (the unique second command set command with shell structure) on to the rendering component. It should be reiterated that the above is a conceptual model of the internal process, which can be implemented in numerous ways using programming techniques commonly known, such as If-Then-Else logic, Switch statements, Case statements, or table-lookup techniques.

Figure 6:
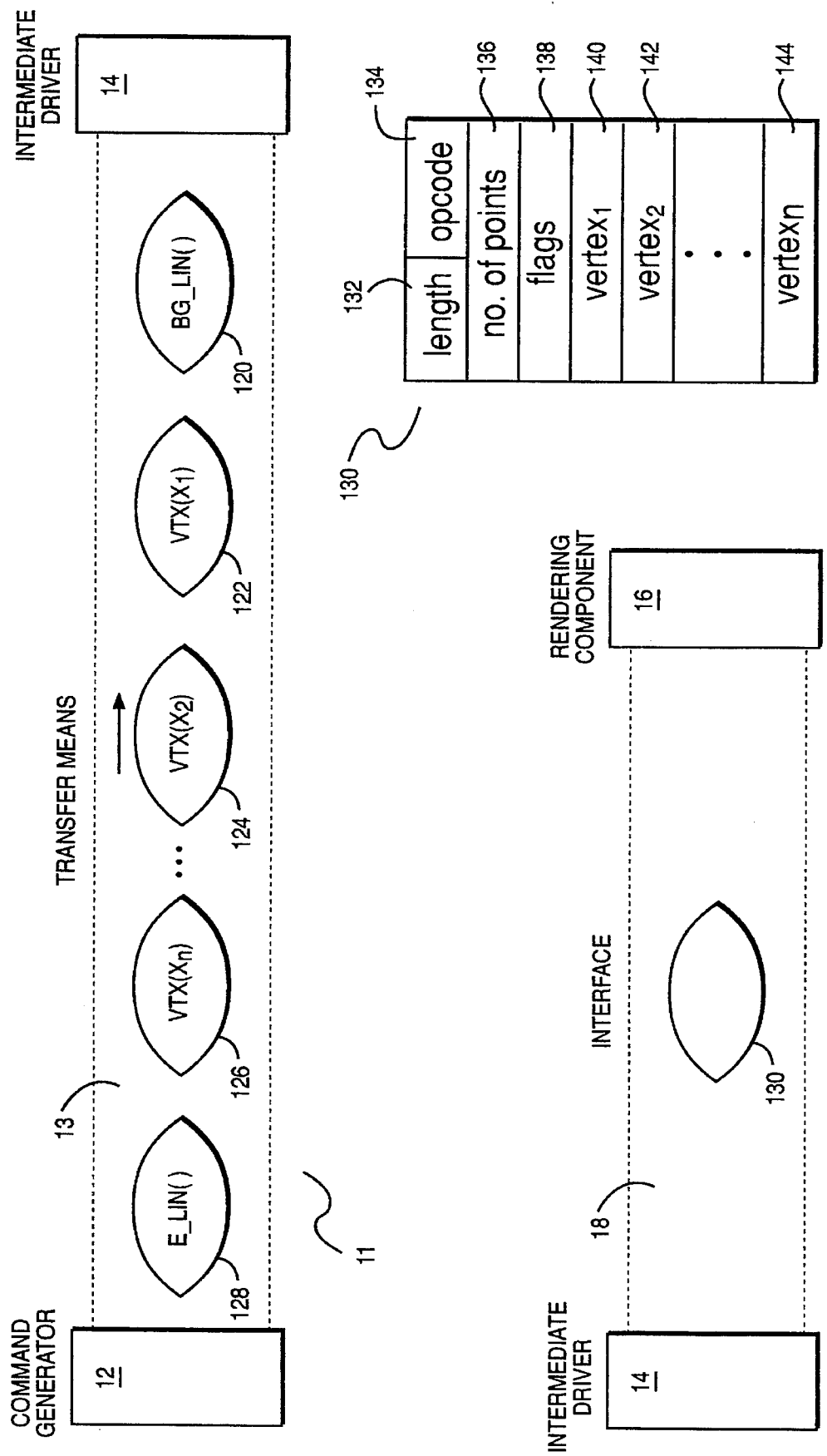
FIG. 6 details the building of a shell command by the intermediate driver.

The function performed by 58 of FIGS. 5a and 5b will now be shown in reference to FIG. 6. As previously described, the command process 11 comprises a command generator 12 coupled to an intermediate driver 14 by transfer means 13. The command generator 12 generates a series of commands 120–128 destined for a rendering adapter 16. To exemplify the building of a shell command as a result of a series of individual commands, a display_polyline command is shown. Second command set commands (44 of FIG. 4) are generated by the command generator 12. A begin_line command 120 is initially generated, followed by a series of vertex commands 122, 124 and 126 having vertex coordinates, and ending with an end_line command 128. When the begin_line command 120 is received by the intermediate driver 14, a shell structure as indicated at 130 is created. This shell structure will be ultimately passed on to the rendering adapter 16. The shell structure is initialized with a length at 132, an opcode at 134 indicating a polyline command, the number of points contained within the polyline at 136, and flags at 138. As each subsequent vertex command 122, 124, and 126 is received by the intermediate driver 14, the coordinate data contained with the vertex command is placed in the shell structure at 140, 142, and 144 respectively. The length 132, number of points 136, and flags 138 are also updated when inserting the vertex data. Finally, when the end_line command 128 is received by the intermediate driver 14, the processing in block 58 of FIG. 4 terminates, and control passes to block 60 of FIG. 4, where the shell structure 130 (resulting first-command-set-syntax-conforming command) is transferred via 18 to the rendering component 16. Other second command set commands 58 can be processed in a similar manner, using programming techniques generally know to those of ordinary skill in the art.

Figure 7:
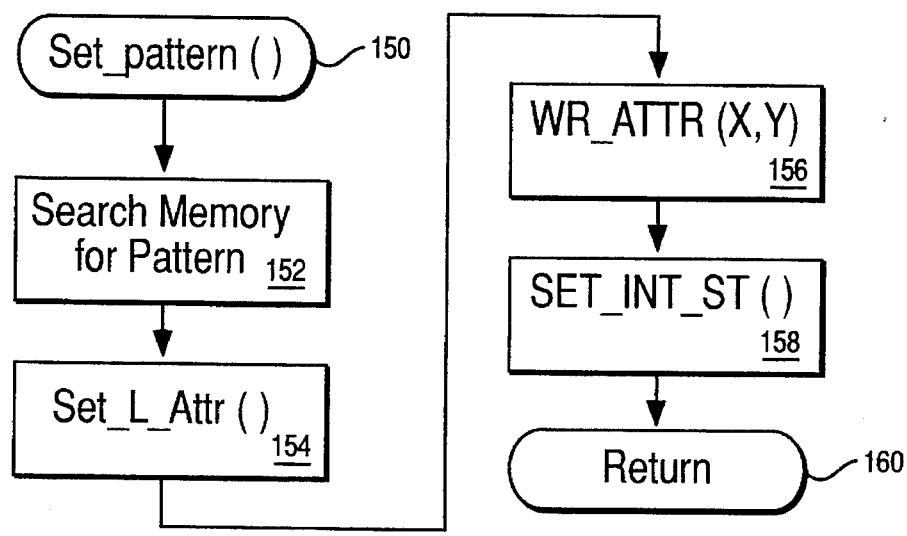
FIG. 7 details the operation of expanding a single command into multiple commands.
Figure 8:
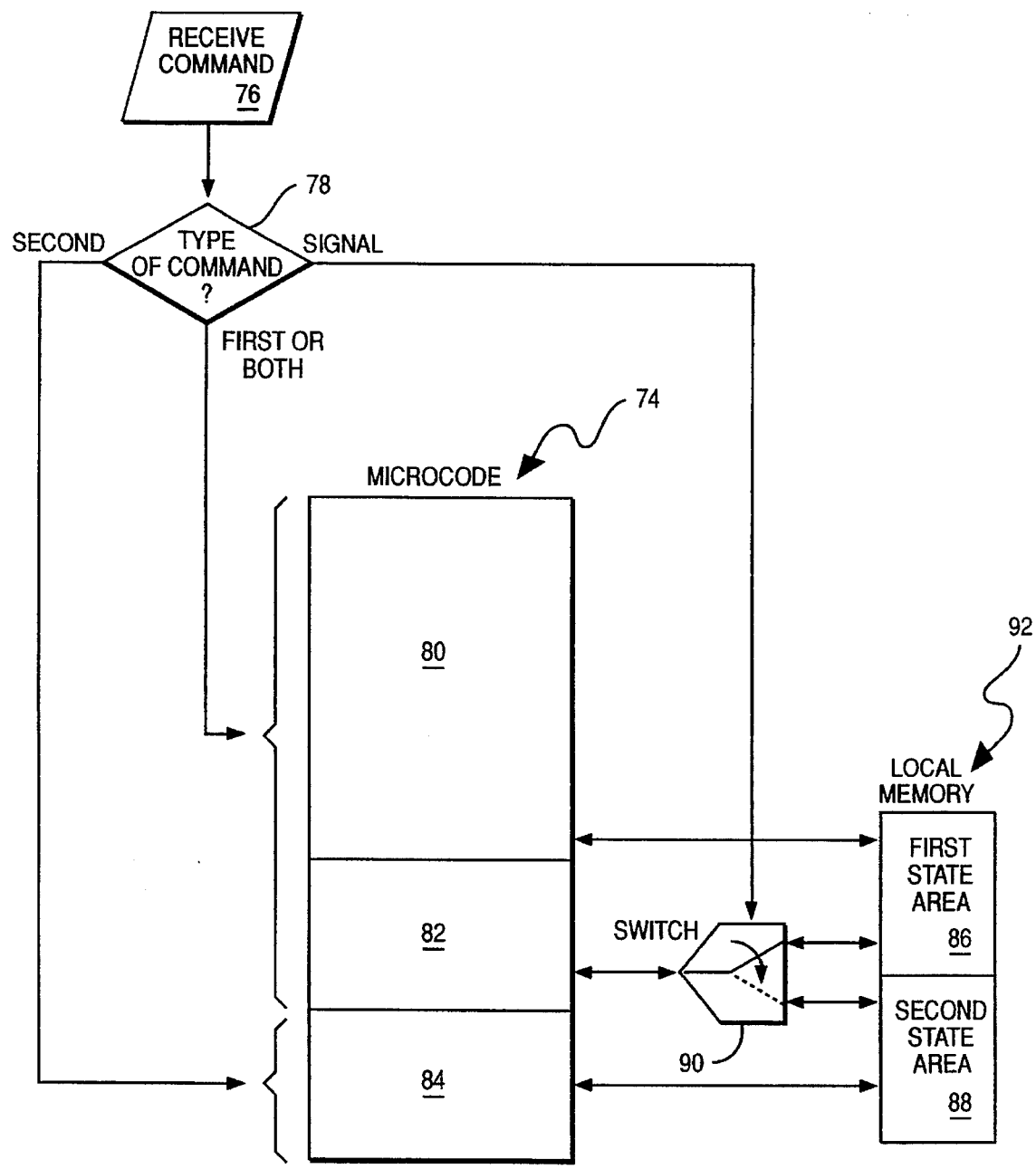
FIG. 8 details the internal operation of the rendering component.

The function of block 54 of FIG. 5a will now be described. This block converts received commands into a combination of first and second command set commands. Referring to FIG. 7, a sample control flow is shown which exemplifies the function of block 54. In this example, a set_pattern command is received at 150. This results in block 54 searching in system memory at 152 to find a pattern as previously defined by a define_pattern command. A setup_load_attributes command is generated at 154, (which is a second command set command 44 of FIG. 4) to obtain the pattern attributes. A write_attributes command is then generated at 156 (which is also a second command set command 44 of FIG. 4) to write the pattern and its size to the rendering component 16. Finally, a set_interior_style command is generated at 158 (which is a first command set command 58 of FIG. 4), which instructs the rendering adapter to use this pattern as the interior style to be used in its subsequent rendering operations. Program control is returned at 160. The above description exemplifies the operation of block 54 in combination with blocks 56 and 58 of FIG. 5a, and how a single command can cause varying combinations of first and second command set commands to be issued to the rendering component. It will be understood to those of ordinary skill in the art that other commands received at 54 could be similarly processed using these and other conventional programming techniques. Upon block 54's completion, control can either pass directly to 60 (FIG. 5a) if no further processing is required, or to either block 56 or 58 if processing as previously described for these blocks is required (e.g. mapping a 48 command or encapsulating a series of second command set commands 44 into a first command set command Turning now to FIG. 8, the rendering component operation will be described. In the preferred embodiment, the primary control for the rendering component is a microprocessor or microcontroller having microcode 74 associated therewith. This microcode is conceptually divided into three components. Commands unique to the first command set are processed by microcode 80. Commands unique to the second command set are processed by microcode 84. Commands which are common (i.e. non-unique commands) to both the first and second command sets are processed by microcode 82 in the preferred embodiment. Alternate embodiments could perform this via a VLSI gate array. When commands are received by the rendering component at 76, a query is made at 78 to determine the appropriate microcode 80, 82, or 84 to invoke. Query 78 is also used to control local memory 92 as follows. A first state area 86 is defined for the first command set to be supported in the multi-command set adapter. The state refers to such things as color, normal, positions, stacks of pick-identifier names, pick data, and stacks of matrices, for example. A second state area 88 is defined for the second command set to be supported. A special command is added to the adapter command set to allow switching at 90 between these first and second states. For rendering commands which are common to either command set 82, this command is used to direct the commands to use the proper state variables 86 or 88.

Figure 9:
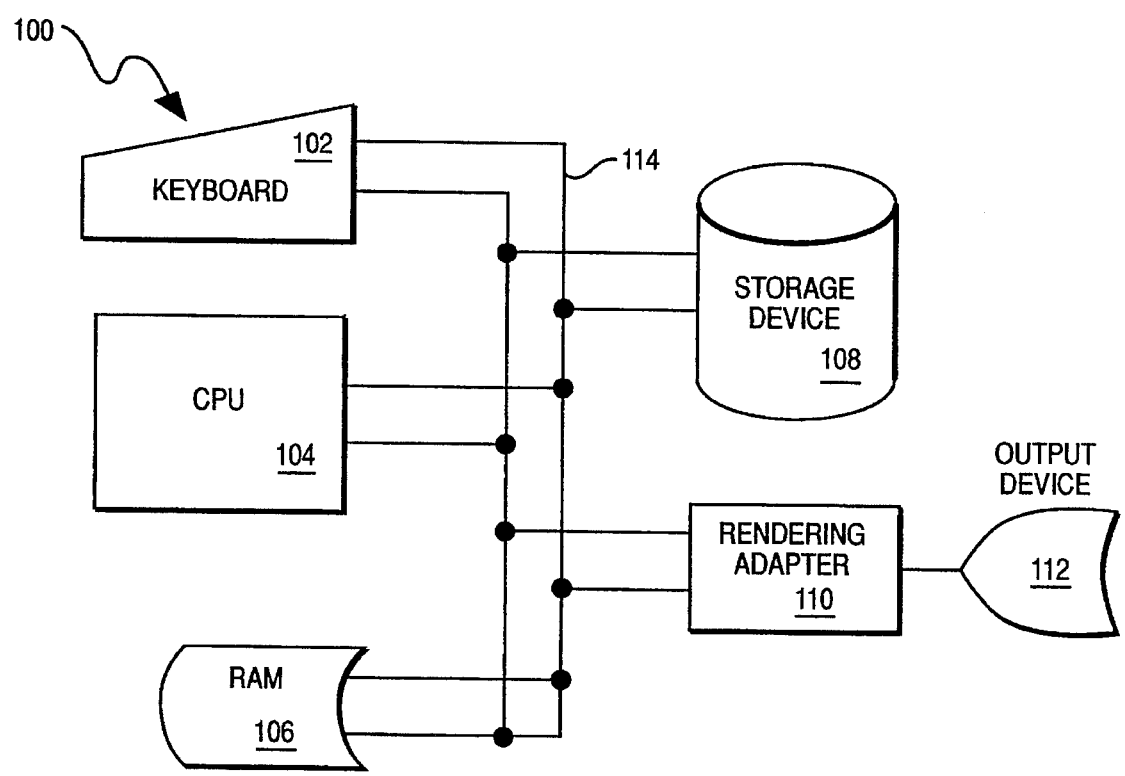
FIG. 9 is a overall system block diagram.

FIG. 9 details the overall system environment 100. A keyboard 102, central processing unit 104, random access storage 106, a nonvolatile storage device 108, and a rendering adapter 110 attached to a rendering output device 112 are interconnected via a bus 114. The hardware devices listed may or may not further include appropriate adapters required for direct bus attachment. In an alternate embodiment, the keyboard 102 and/or random access storage 106 may attach directly to the central processing unit 104 in order to achieve increased performance. In the preferred embodiment, the rendering output device 112 is a display and the rendering adapter 110 is a graphics adapter. In an alternate embodiment, the rendering output device 112 is a printer, and the rendering adapter 110 is a printer adapter. Likewise, in an alternate embodiment, the rendering adapter 110 may attach directly to the CPU 104 in order to achieve enhanced performance.

While we have illustrated and described the preferred embodiments of this invention, it is to be understood that we do not limit ourselves to the precise construction herein disclosed and the right is reserved to all changes and modifications coming within the scope of the invention as described in the appended claims.

We claim:

1. A method for providing multi-command support in a rendering adapter, comprising:

receiving first commands of a first command set by an intermediate driver and providing said first commands to a rendering adapter;

receiving second commands of a second command set by said intermediate driver, converting on a first processor some of said second commands into resulting first command set commands while other second commands are not convertible into first command set commands, and providing said resulting first command set commands and said second commands not convertible into resulting first command set commands to said rendering adapter; and receiving, from said intermediate driver, and executing, by a second processor on said rendering adapter, said first commands, said resulting first command set commands, and said second commands not convertible into resulting first command set commands.

2. A method of claim 1 wherein said intermediate driver is achieved by using a device driver.

3. A method of claim 1 wherein said first and second commands include a state area switch command.

4. The method of claim 1 wherein said step of receiving second commands includes reformatting said second commands not convertible into resulting first commands to conform to a syntax of the first command set.

5. The method of claim 4 wherein the step of receiving and executing includes executing said first commands and said resulting first command set commands utilizing a first portion of microcode stored in memory and executing said second commands not convertible into resulting first command set commands utilizing a second portion of microcode stored in memory.

6. A method for providing multi-command support in a rendering adapter, comprising:

generating any of first command set commands and second command set commands by an application program executing on a data processing system;

initiating a transfer, by said application program, of any of first command set commands and second command set commands to a rendering adapter;

receiving first commands of a first command set by an intermediate driver;

providing said first commands to a rendering adapter;

receiving second commands of a second command set by said intermediate driver, wherein said intermediate driver converts on a first processor some of said second commands into resulting first command set commands while other second commands are not convertible into first command set commands;

providing said resulting first command set commands and said second commands not convertible into resulting first command set commands to said rendering adapter; and receiving, from said intermediate driver, and executing, by a second processor on said rendering adapter, said first commands, said resulting first command set commands, and said second commands not convertible into resulting first command set commands.

7. A method of claim 6 wherein said transferring is achieved by using memory-mapped I/O.

8. A method of claim 6 wherein said transferring is achieved by using I/O port addressing.

9. The method of claim 6 wherein said step of receiving second commands includes reformatting said second commands not convertible into resulting first commands to conform to a syntax of the first command set.

10. The method of claim 9 wherein the step of receiving and executing includes executing said first commands and said resulting first command set commands utilizing a first portion of microcode stored in memory and executing said second commands not convertible into resulting first command set commands utilizing a second portion of microcode stored in memory.

11. A system for providing multi-command support, comprising:

means for receiving first commands of a first command set and second commands of a second command set by an intermediate driver, wherein said intermediate driver converts on a first processor some of said second commands into resulting first command set commands while other second commands are not convertible into first command set commands;

means for providing from said intermediate driver said first commands, said resulting first command set commands and said second commands not convertible into resulting first command set commands; and a rendering adapter for receiving, from said intermediate driver, and executing on a second adapter said first commands, said resulting first command set commands, and said second commands not convertible into resulting first command set commands.

12. A system of claim 11 wherein said rendering adapter is any of a graphics adapter and a printer adapter.

13. The system of claim 11 wherein said means for receiving first and second commands includes reformatting said second commands not convertible into resulting first commands to conform to a syntax of the first command set.

14. The system of claim 13 wherein the rendering adapter includes executing said first commands and said resulting first command set commands utilizing a first portion of microcode stored in memory and executing said second commands not convertible into resulting first command set commands utilizing a second portion of microcode stored in memory.

15. A system for providing multi-command support, comprising:

means for receiving first commands of a first command set and second commands of a second command set by an intermediate driver;

means for providing said first commands, by said intermediate driver;

means for converting, by said intermediate driver on a first processor, some of said second commands into resulting first command set commands while other second commands are not convertible into first command set commands;

means for providing said resulting first command set commands and said second commands not convertible into resulting first command set commands, by said intermediate driver; and a rendering adapter for receiving, from said intermediate driver, and executing on a second processor said first commands, said resulting first command set commands, and said second commands not convertible into resulting first command set commands.

16. A system of claim 15 wherein said rendering adapter is any of a graphics adapter, a printer adapter and a multimedia adapter.

17. The system of claim 15 wherein said means for converting includes reformatting said second commands not convertible into resulting first commands to conform to a syntax of the first command set.

18. The system of claim 17 wherein the rendering adapter includes executing said first commands and said resulting first command set commands utilizing a first portion of microcode stored in memory and executing said second commands not convertible into resulting first command set commands utilizing a second portion of microcode stored in memory.

19. An apparatus for controlling a rendering component of a data processing system, comprising:

means for receiving rendering commands by an intermediate driver, said rendering commands comprising first commands of a first command set and second commands of a second command set;

means for maintaining in a rendering component a first state area for said first commands and a second state area for said second commands;

means for interpreting said rendering commands including converting on a first processor some of said second commands to resulting first command set commands while other second commands are not convertible into first command set commands; and a rendering adapter for receiving, from said means for interpreting, and executing on a second processor said first commands and said resulting first command set commands while utilizing a first state area, and executing said second commands not convertible into resulting first command set commands while utilizing a second state area.

20. An apparatus of claim 19 wherein said rendering component is any of a graphics adapter and a printer adapter.

21. The apparatus of claim 19 wherein said means for interpreting includes reformatting said second commands not convertible into resulting first commands to conform to a syntax of the first command set.

22. The apparatus of claim 21 wherein the rendering adapter includes executing said first commands and said resulting first command set commands utilizing a first portion of microcode stored in memory and executing said second commands not convertible into resulting first command set commands utilizing a second portion of microcode stored in memory.

23. A data processing system comprising:

a keyboard;

a central processing unit;

memory means for storing data;

nonvolatile storage;

an intermediate driver for receiving first commands of a first command set and second commands of a second command set, wherein said intermediate driver converts on said central processing unit some of said second commands into resulting first command set commands while other second commands are not convertible into first command set commands and;

a rendering adapter for receiving, from said intermediate driver, and executing on a adapter processor said first commands, said resulting first command set commands, and said second commands not convertible into resulting first command set commands.

24. The data processing system of claim 23 wherein said intermediate driver includes reformatting said second commands not convertible into resulting first commands to conform to a syntax of the first command set.

25. The data processing system of claim 24 wherein the rendering adapter includes executing said first commands and said resulting first command set commands utilizing a first portion of microcode stored in memory and executing said second commands not convertible into resulting first command set commands utilizing a second portion of microcode stored in memory.

* * * * *